(12) United States Patent
Pance

(10) Patent No.: US 8,378,857 B2
(45) Date of Patent: Feb. 19, 2013

(54) ILLUMINATION OF INPUT DEVICE

(75) Inventor: Aleksandar Pance, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 12/839,251

(22) Filed: Jul. 19, 2010

(65) Prior Publication Data

US 2012/0013490 A1    Jan. 19, 2012

(51) Int. Cl.
*H03K 17/94* (2006.01)
(52) U.S. Cl. ............................................. 341/28; 341/22
(58) Field of Classification Search .................... 341/28, 341/22
See application file for complete search history.

(56) References Cited

U.S. PATENT DOCUMENTS

| | | | |
|---|---|---|---|
| 3,060,790 | A | 10/1962 | Ward |
| 3,754,209 | A | 8/1973 | Molloy et al. |
| 4,855,740 | A | 8/1989 | Muramatsu et al. |
| 5,040,479 | A | 8/1991 | Thrash |
| 5,317,105 | A | 5/1994 | Weber |
| 5,342,991 | A | 8/1994 | Xu et al. |
| 5,456,955 | A | 10/1995 | Muggli |
| 5,770,898 | A | 6/1998 | Hannigan et al. |
| 5,975,953 | A | 11/1999 | Peterson |
| 6,180,048 | B1 | 1/2001 | Katori |
| 6,347,882 | B1 | 2/2002 | Vrudny et al. |
| 6,545,668 | B1 | 4/2003 | Hayama |
| 6,654,174 | B1 | 11/2003 | Huang |
| 6,713,672 | B1 | 3/2004 | Stickney |
| 6,762,381 | B2 | 7/2004 | Kunthady et al. |
| 6,797,902 | B2 | 9/2004 | Farage et al. |
| 6,800,805 | B2 | 10/2004 | Deguchi |
| 6,834,294 | B1 | 12/2004 | Katz |
| 6,879,317 | B2 | 4/2005 | Quinn et al. |
| 6,998,594 | B2 | 2/2006 | Gaines et al. |
| 7,001,060 | B1 | 2/2006 | Kimura |
| 7,008,090 | B2 | 3/2006 | Blank |
| 7,019,242 | B2 | 3/2006 | Kim |
| 7,053,799 | B2 | 5/2006 | Yu et al. |
| 7,088,261 | B2 | 8/2006 | Sharp et al. |
| 7,109,465 | B2 | 9/2006 | Kok et al. |
| 7,133,030 | B2 | 11/2006 | Bathiche |
| 7,161,587 | B2 | 1/2007 | Beck et al. |
| 7,236,154 | B1 | 6/2007 | Kerr et al. |

(Continued)

FOREIGN PATENT DOCUMENTS

CN    201185147    1/2009
EP    1566686    8/2005

(Continued)

OTHER PUBLICATIONS

Author Unknown, "Electronic Polymers, Semiconducting Polymers and Light Emitting Polymers—Focus of Polythiophene," Azom.com, http://www.azom.com/details.asp?ArticleID=2772, at least as early as Dec. 1, 2005.

(Continued)

*Primary Examiner* — Patricia Nguyen
(74) *Attorney, Agent, or Firm* — Dorsey & Whitney LLP

(57) ABSTRACT

Input devices having backlighting for associated input mechanisms. The backlighting may be supplied by a light source coupled to a light guide. Both the light guide and light source may be located completely beneath the input mechanism and above a mechanical support for the mechanism. Each input mechanism generally has its own dedicated light guide and light source.

20 Claims, 10 Drawing Sheets

U.S. PATENT DOCUMENTS

| | | | |
|---|---|---|---|
| 7,281,837 B2 | 10/2007 | Yue et al. | |
| 7,283,066 B2 | 10/2007 | Shipman | |
| 7,315,908 B2 | 1/2008 | Anderson | |
| 7,326,154 B2 | 2/2008 | Foley | |
| 7,364,339 B2 | 4/2008 | Park | |
| 7,414,213 B2 | 8/2008 | Hwang et al. | |
| 7,417,624 B2 | 8/2008 | Duff | |
| 7,446,303 B2 | 11/2008 | Maniam et al. | |
| 7,453,441 B1 | 11/2008 | Iorfida et al. | |
| 7,470,862 B2 | 12/2008 | Lin et al. | |
| 7,470,866 B2 | 12/2008 | Dietrich et al. | |
| 7,473,139 B2 | 1/2009 | Barringer et al. | |
| 7,501,960 B2 | 3/2009 | Price et al. | |
| 7,557,690 B2 | 7/2009 | McMahon | |
| 7,582,839 B2 | 9/2009 | Kyowski et al. | |
| 7,598,686 B2 | 10/2009 | Lys et al. | |
| 7,692,111 B1* | 4/2010 | Rosing et al. | 200/310 |
| 7,710,369 B2 | 5/2010 | Dowling | |
| 7,712,910 B2* | 5/2010 | Ng et al. | 362/85 |
| 7,750,282 B2 | 7/2010 | Mahowald et al. | |
| 7,750,352 B2 | 7/2010 | Thurk | |
| 7,769,353 B2 | 8/2010 | Dietrich et al. | |
| 7,778,590 B2 | 8/2010 | Kogo | |
| 7,825,907 B2* | 11/2010 | Choo et al. | 345/173 |
| 7,825,917 B2 | 11/2010 | Bryant et al. | |
| 7,845,953 B2 | 12/2010 | Brock et al. | |
| 7,863,822 B2 | 1/2011 | Stoschek et al. | |
| 7,880,131 B2 | 2/2011 | Andre et al. | |
| 7,968,835 B2 | 6/2011 | Tsai | |
| 8,017,216 B2 | 9/2011 | Kato et al. | |
| 8,018,170 B2 | 9/2011 | Chen et al. | |
| 8,080,753 B2 | 12/2011 | Yeh et al. | |
| 8,160,562 B2 | 4/2012 | Yuki et al. | |
| 8,282,261 B2 | 10/2012 | Pance et al. | |
| 2003/0174072 A1 | 9/2003 | Salomon | |
| 2003/0210221 A1 | 11/2003 | Aleksic | |
| 2004/0032745 A1 | 2/2004 | Pederson | |
| 2004/0230912 A1 | 11/2004 | Clow et al. | |
| 2004/0238195 A1 | 12/2004 | Thompson | |
| 2005/0073446 A1 | 4/2005 | Lazaridis et al. | |
| 2006/0022951 A1 | 2/2006 | Hull | |
| 2006/0158353 A1 | 7/2006 | Tseng | |
| 2006/0180450 A1* | 8/2006 | Clark et al. | 200/333 |
| 2007/0046646 A1* | 3/2007 | Kwon et al. | 345/173 |
| 2008/0001787 A1 | 1/2008 | Smith et al. | |
| 2008/0127537 A1 | 6/2008 | Boisseau | |
| 2008/0143560 A1* | 6/2008 | Shipman | 341/22 |
| 2008/0166006 A1 | 7/2008 | Hankey et al. | |
| 2008/0303918 A1 | 12/2008 | Keithley | |
| 2009/0201179 A1 | 8/2009 | Shipman et al. | |
| 2009/0225022 A1* | 9/2009 | Tolbert | 345/105 |
| 2009/0277763 A1 | 11/2009 | Kyowski et al. | |
| 2010/0008030 A1 | 1/2010 | Weber et al. | |
| 2010/0044067 A1 | 2/2010 | Wong et al. | |
| 2010/0238120 A1 | 9/2010 | Hsieh | |
| 2010/0265181 A1 | 10/2010 | Shore | |
| 2010/0300856 A1 | 12/2010 | Pance et al. | |
| 2010/0301755 A1 | 12/2010 | Pance et al. | |
| 2010/0302169 A1 | 12/2010 | Pance et al. | |
| 2010/0306683 A1 | 12/2010 | Pance et al. | |
| 2011/0280042 A1 | 11/2011 | Pance et al. | |
| 2011/0304485 A1 | 12/2011 | Mahowald et al. | |
| 2012/0012448 A1 | 1/2012 | Pance et al. | |

FOREIGN PATENT DOCUMENTS

| | | |
|---|---|---|
| EP | 1881513 | 1/2008 |
| EP | 2017694 | 1/2009 |
| GB | 2431001 | 4/2007 |
| JP | 60004094 | 1/1985 |
| KR | 100870113 | 11/2008 |
| WO | WO2007/002796 | 1/2007 |
| WO | WO2007/102633 | 9/2007 |
| WO | WO2009/136929 | 11/2009 |

OTHER PUBLICATIONS

Author Unknown, "Long Polymers Light Up LEDs," Physicsweb. org, http://www.physicsweb.org/articles/news/6/4/22/1, at least as early as Apr. 30, 2002.

Author Unknown, "Optimus Keyboard," Art.Lebedev Studio, http://www.artlebedev.com/portfolio/optimus/, at least as early as Dec. 1, 2005.

Author Unknown, "Optimus OLED Keyboard," Gizmodo: The Gadgets Weblog, http://www.gizmodo.com/gadgets/peripherals/input/optimus-oled-keyboard-112517.php, at least as early as Dec. 1, 2005.

Author Unknown, "Optimus OLED Keyboard with Customizable Layout," Gear Live, http://www.gearlive.com/index.php/news.article/optimus_oled_keyboard_07131058/, at least as early as Dec. 1, 2005.

Author Unknown, "Optimus Russian Keyboard," Primo Tech, http://www.primotechnology.com/index.php?art+articles/0705/optimus/index.htm, at least as early as Dec. 1, 2005.

Author Unknown, "Organic Light-Emitting Diode," Wikipedia.com, http://en.wikipedia.org/wiki/OLED, at least as early as Dec. 1, 2005.

Author Unknown, "Organic Polymers to Precede Nano Semi," EETimes.com, http://www.eet.com/story/OEG20030923S0055, at least as early as Dec. 1, 2005.

Author Unknown, "How, Why & Where to Use Self-Clinching Fasteners," PennEngineering, http://www.pemnet.com/fastening_products/about_self_clinching/index.html, 2 pages, at least as early as Dec. 21, 2011.

Author Unknown, "Physics News Update," American Institute of Physics, http://www.aip.org/pnu/1993/split/pnu148-3.htm, Oct. 19, 1993.

Author Unknown, "Polymer Light-Emitting Diodes," Philips Research—Technologies, http://www.research.philips.com/technologies/display/polyled/polyled/, at least as early as Dec. 1, 2005.

Author Unknown, "What is OLED (Organic Light Emitting Diode)?," WiseGeek.com, http://www.wisegeek.com/what-is-an-oled.htm?referrer+adwords_campaign=oled_ad=024 . . . , at least as early as Dec. 1, 2005.

Author Unknown, "What is PLED?—A Word Definition from the Webopedia Computer Dictionary," http://www.webopedia.com/TERM/P/PLED/html, at least as early as Dec. 1, 2005.

Braun et al., "Transient Repsonse of Passive Matrix Polymer LED Displays," http://www.ee.calpoly.edu/~dbraun/papers/ICSM2000BraunEricksonK177.html, at least as early as Dec. 1, 2005.

Rojas, "Optimus Keyboard Trumped by the Display Keyboard?," http://www.engadget.com/2005/07/29/optimus-keyboard-trumped-by-the-display-keyboard/, Jul. 29, 2005.

\* cited by examiner

ILLUMINATION OF INPUT DEVICE

TECHNICAL FIELD

Embodiments described herein relate generally to input devices such as keyboards, and more specifically to illuminating input devices.

BACKGROUND

Electronic devices are ubiquitous in society and can be found in everything from household appliances to computers. Many electronic devices include visual display elements that can be selectively or fully illuminated by a light source, often through backlighting. For example, many electronic devices include keyboards or keypads that can be backlit to allow a user to interact with the device in low light settings. Other electronic devices may be configured to illuminate an associated keyboard or keypad for purely aesthetic purposes.

While providing an attractive backlight for a user is useful in many electronic devices, much of the aesthetic and practical appeal of a device can quickly be compromised if the light source does not transmit enough light to be adequately perceived by a user. Additionally, the light source required for many visual display elements can quickly drain the power source of the electronic device. This may be a problem, for example, when the electronic device is running on battery power or some other depletable power source. Likewise, uneven or inadequate lighting may further detract from the aesthetic appeal or functional aspects of a device.

Although many designs for providing illuminated visual display elements on electronic and personal devices have generally worked well in the past, there is a desire to provide new and improved designs or techniques that result in even more aesthetically pleasing and power-efficient visual display elements. In particular, the ability to provide visual display elements on electronic and personal devices in a manner that can generate a sufficient amount of light to fulfill a purpose while conserving space and power is desirable.

SUMMARY

Embodiments discussed herein generally take the form of input devices having backlighting for associated input mechanisms. The backlighting may be supplied by a light source coupled to a light guide. Both the light guide and light source may be located completely beneath the input mechanism and above a mechanical support for the mechanism. Each input mechanism generally, although not necessarily, has its own dedicated light guide and light source.

One embodiment may take the form of an input device, comprising: an input mechanism operative to move along an axis, the input mechanism having a front face and a back face; a housing mechanically connected to the input mechanism; a light source located beneath the input mechanism; a light guide optically coupled to the light source and the input mechanism and entirely located beneath the input mechanism; wherein the light guide redirects at least some light emitted from the light source through the back face of the input mechanism and through the front face of the input mechanism.

Yet another embodiment may take the form of a method for illuminating an input mechanism, including the operations of: providing power to a light source located beneath the input mechanism through an electrical connection between a portion of the input mechanism and a housing for the input mechanism; directing light emitted from the light source by changing a direction of travel of the light, such that the light passes through the input mechanism; in response to a disruption in the electrical connection, the disruption caused by a motion of the input mechanism, ceasing to provide power to the light source.

Still another embodiment takes the form of an input device, including: a plurality of input mechanisms mechanically attached to an input device housing; a plurality of light guides, each of the plurality of light guides located beneath and adjacent to each of the plurality of input devices in a one-to-one relationship, each of the light guides not extending beyond an outer edge of the associated input mechanism; a plurality of light sources, at least one light source of the plurality of light sources coupled to each light guide, each of the at least one light sources emitting light into the coupled light guide; and a plurality of mechanical support underlying the plurality of light guides and the plurality of input mechanisms.

DETAILED DESCRIPTION

Embodiments discussed herein generally take the form of input devices having backlighting for associated input mechanisms. The backlighting may be supplied by a light source coupled to a light guide. Both the light guide and light source may be located completely beneath the input mechanism and above a mechanical support for the mechanism. Each input mechanism generally, although not necessarily, has its own dedicated light guide and light source.

Figure 1:
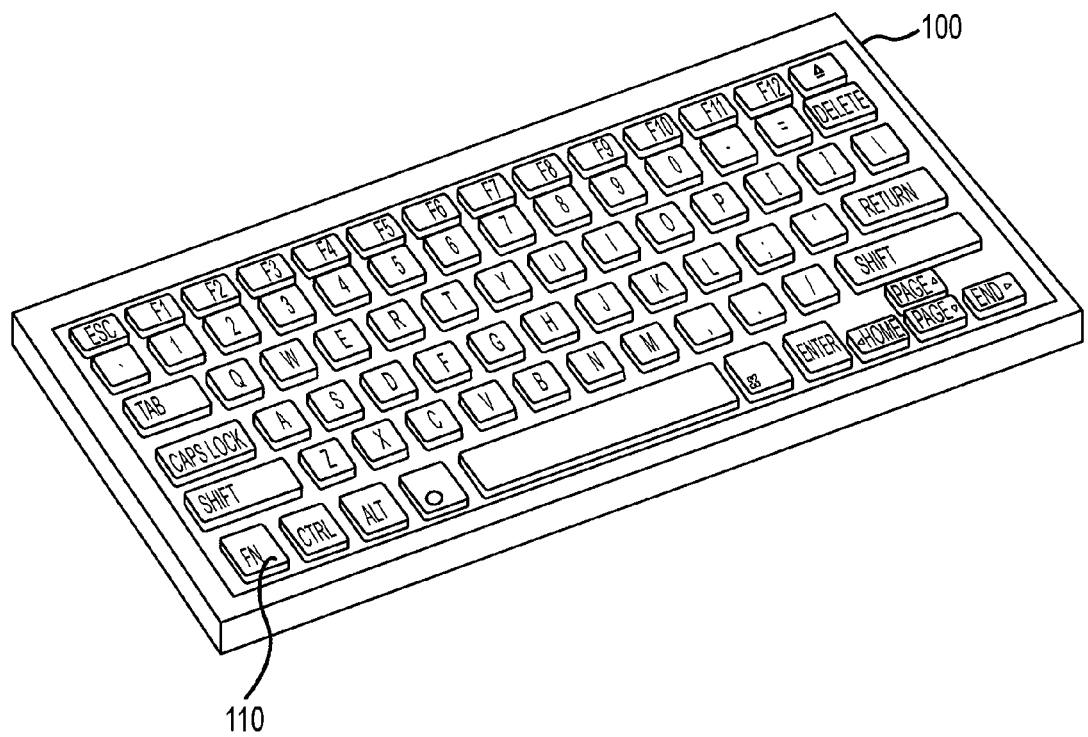
FIG. 1 depicts a keyboard.

FIG. 1 generally depicts a keyboard 100. Although the keyboard is shown as stand-alone, it should be appreciated that the discussion herein applies generally to all illuminated keyboards, whether stand-alone or integrated into another product such as a laptop computer. Likewise, certain principles discussed herein may be applied to other input and/or output devices, such as mice, trackballs and the like. The keyboard may be considered an "input device" and each key an "input mechanism."

Figure 2:
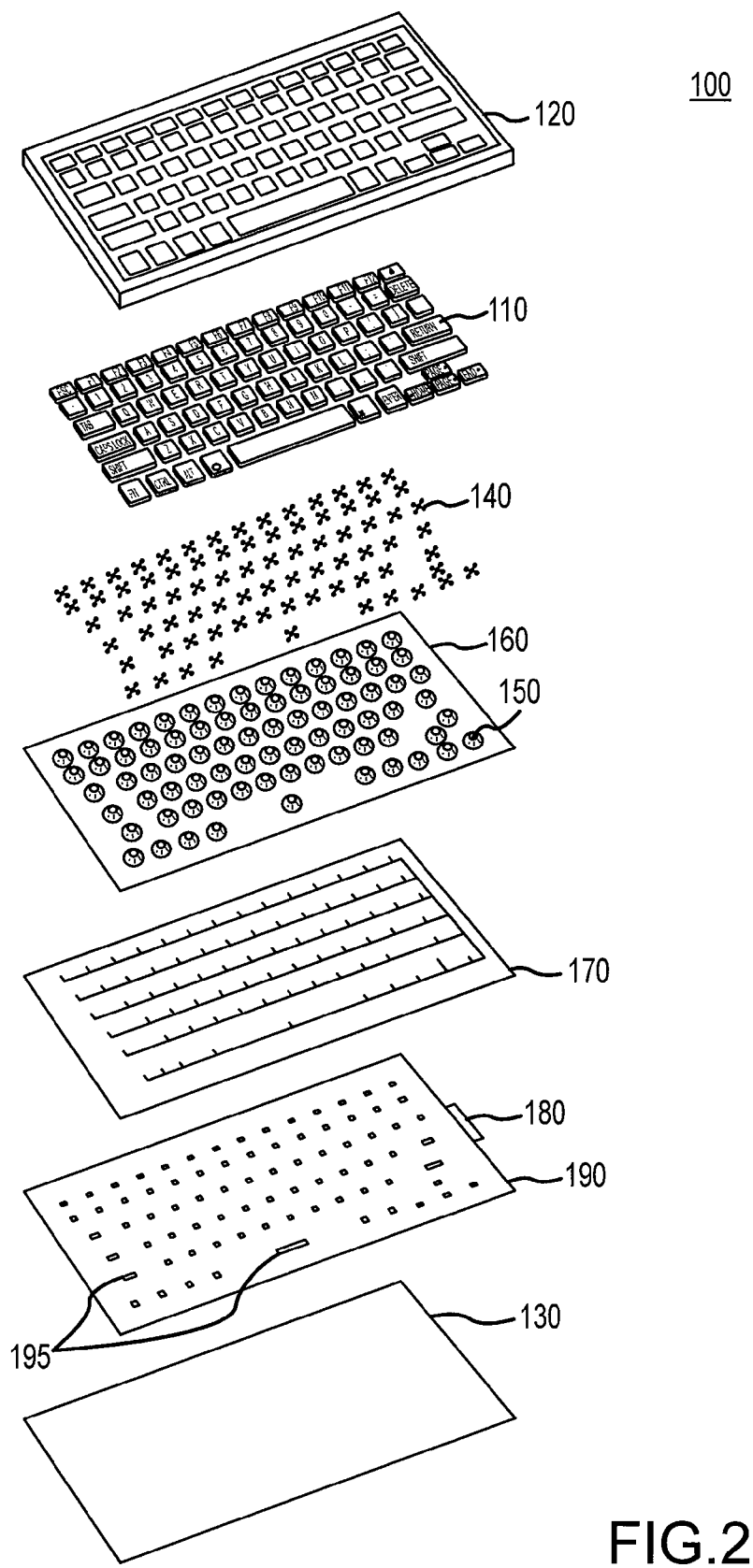
FIG. 2 is an exploded view of the keyboard of FIG. 1.

The keyboard 100 of FIG. 1 includes multiple keys 110 that may be illuminated by one or more backlights. FIG. 2 generally shows an exploded view of the keyboard 100 of FIG. 1. As shown, the keyboard typically includes multiple layers. The individual keys 110 are at least partially contained within a housing or faceplate 120 that surrounds the keyboard. A backplate 130 may define a bottom portion of the housing 120. Each key is attached to a mechanical scissor 140 that biases the key upward. As a key 110 is pressed, the scissor collapses, permitting the key to travel downward. This motion also collapses a dome switch 150 located beneath the keyboard. The dome switches 150 all may be formed on a single dome switch layer 160. A metal patch is formed at the top of the dome. When this patch impacts a contact on the wiring layer 170 beneath the dome. The wiring layer is connected to a microprocessor, which detects the short circuit, registers it as a key press and generates an output or otherwise processes the short circuit accordingly. A support layer (not shown) may be located adjacent the wiring layer to provide structural stiffness to the wiring.

In another embodiment, the downward motion of the key 110 pushes a plunger or other protrusion through a hole at the top of a dome 150. The plunger, which generally has an end made of metal or that is otherwise electrically conductive, touches a contact on the bottom of the dome switch when the keyboard is sufficiently depressed. This contact creates a short circuit with the results discussed above.

As also shown in FIG. 2, many keyboards 100 include an illumination system that backlights one or more individual keys 110. In order to be backlit, a key 110 generally has its legend, symbol or the like etched through the paint or other opaque surface of the key. Oftentimes, this etching is in the shape of the letter, number or symbol corresponding to the key's input. One or more light-emitting diodes (LEDs) 180 are positioned around the exterior of a light guide. (In some cases, one or more LEDs may also be placed in apertures within the light guide.) Light is emitted by the LEDs into the light guide 190, which is formed from a transparent or translucent material that permits the light to propagate therethrough. Example materials include fiber optic bundles, acrylic, polycarbonate, acrylonitrile-butadiene-atyrene and so on. Power may be supplied to the LEDs 180 through an appropriately configured circuit, which typically is coplanar with or underneath the LEDs and light guide 190. It should likewise be noted that the LEDs may be generally coplanar with the light guide.

A pattern of microlenses 195 is formed on the light guide 190. As light emitted from the LEDs 180 enters the microlenses 195, the light is redirected to be emitted upward and out of the microlenses. Thus, when side-firing LEDs are used, light is redirected from traveling along an X-Y plane to traveling along a Z-axis. Either side-firing or top-firing LEDs 180 may be coupled to the light guide 190, or in certain embodiments both side- and top-firing LEDs may be used. Although the microlens 195 pattern of the light guide 190 may vary depending on the keyboard size and layout, as well as the type of LEDs 180 used and their positions, the operation of the light guide is generally as described herein. Further, a base of the light guide may be reflective or reflectively coated to redistribute back into the light guide light that would otherwise exit the guide through the base.

Generally, the light guide 190 redirects light from the LEDs 180 and transmits it to the bottom of each key 110, where it may backlight the key and be seen through the legend or other etching on the key face. In this fashion, the keys may be illuminated by the LEDs.

Although the keyboard 100 of FIGS. 1 and 2 provides backlighting for keys 110, it may be inefficient. Because the light guide 190 and LEDs 180 are located beneath the wiring layer 170, support layer (if any), dome switch layer 160 and scissor mechanism 140 for each key, much of the light exiting the light guide is blocked by these components. Thus, relatively power-hungry LEDs 180 must be used to illuminate the keyboard 100 since only a fraction of the emitted light can be seen through the various physical layers. This may also lead to variances in brightness between keys 110, since the physical layers may bock more light in some areas and less in others, depending on the layout of the stacked layers.

Figure 3:
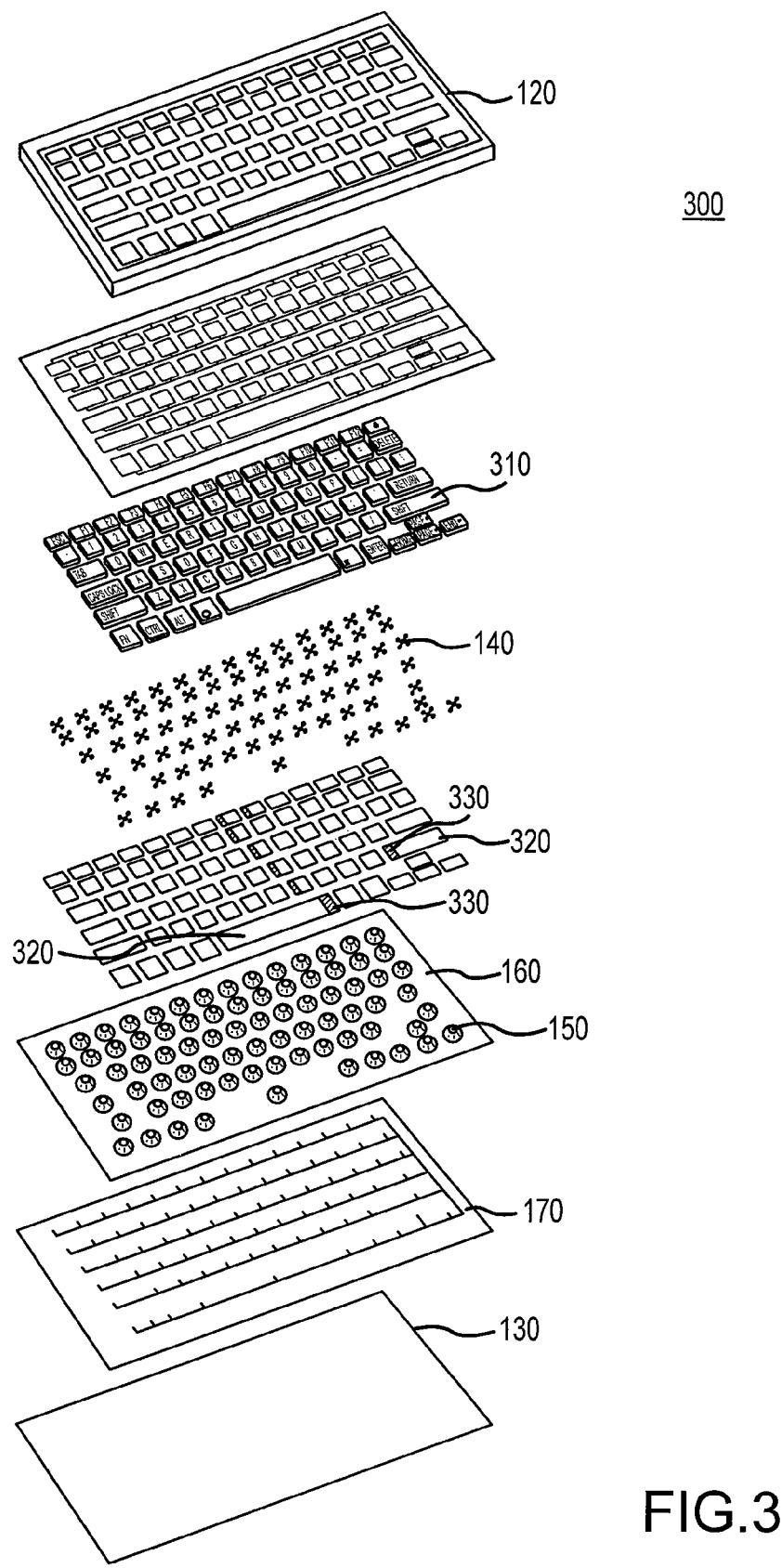
FIG. 3 is an exploded view of a keyboard having individual backlighting for each key.
Figure 4:
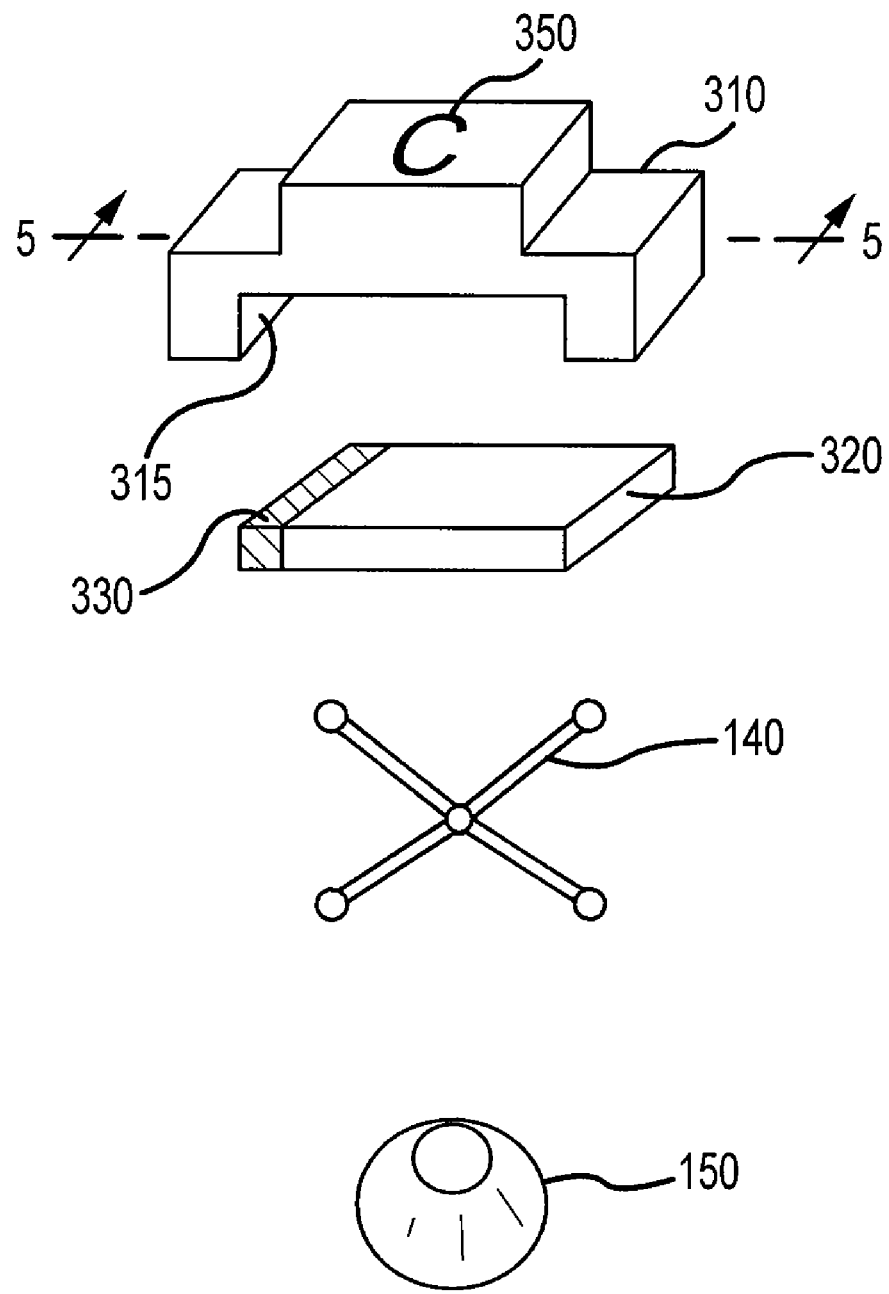
FIG. 4 is an exploded view of a key having individual backlighting.
Figure 5:
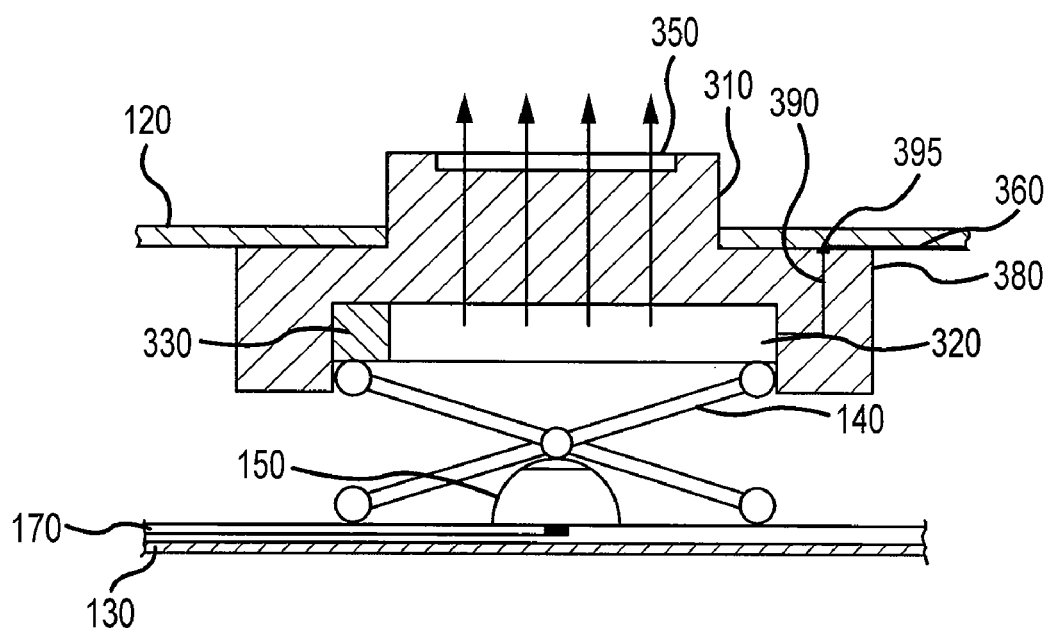
FIG. 5 is a cross-sectional view of a portion of the key and keyboard of FIG. 3, taken along line 4-4 of FIG. 4.

FIG. 3 shows an exploded view of a keyboard 300 with individual key backlighting, while FIG. 4 is an exploded view of a sample key from the keyboard of FIG. 3. As shown, the keyboard again includes multiple keys. This keyboard, however, lacks a light guide layer 190. Instead, each key includes an individual light guide 320 as shown to best effect in FIGS. 4 and 5. FIG. 5 is a cross-sectional view of the key stack of FIG. 4, when the key stack is in a normal configuration (e.g., an operating configuration as opposed to an exploded one).

As best seen in the cross-sectional view of FIG. 5, a LED 330 and light guide 320 may be placed beneath the keycap 310 and mechanically held against the keycap by the scissor mechanism 340. (In alternative embodiments, the LED 330 and/or light guide 320 may be adhered to the keycap 310, held in place by one or more detents, frictionally fitted beneath the keycap and the like.) In the illustrated embodiment, the LED is side-firing although alternative embodiments may use a top-firing LED. Generally, a hollow 315 is formed on the bottom side of the keycap 310 and the LED 330 and light guide 320 are fitted within the hollow. The top of the keycap may be etched to form a legend 350 as previously described, to permit light to emanate therethrough. It should be appreciated that the depth of the etching varies depending on the depth of the paint or other light-blocking element on the surface of the keycap, as well as the translucence of the key.

Since the LED and light guide are located directly beneath the keycap, no light is lost or blocked by intervening layers of wiring, support structures and the like.

Since the LED 330 and light guide are located beneath the keycap 310 and little or no light is lost or blocked, thus permitting nearly all light generated by the LED to pass through the etched portion of the keycap, the LED may be significantly less powerful than those used in other devices or with other mechanisms, such as the keyboard of FIG. 1. That is, the LED 330 may draw less power but make each key 310 appear as bright as significantly more power-hungry LEDs used in a conventional backlighting system. In one embodiment, the LED in the keycap 310 configuration of FIGS. 4 and 5 requires only 5% as much power as an LED used with the light guide of FIG. 2 to provide the same illumination through a keycap. Thus, the duty cycle of the LED 330 of FIGS. 4 and 5 may be $\frac{1}{20}^{th}$ that of the LED 180 of FIGS. 1 and 2. This may be achieved, for instance, through pulse-width modulation of the LED's power source. Typically, the pulse-width modulation cycle or repetition rate is higher than 60 Hz or the like, in order to avoid the human eye perceiving any flicker in the operation of the LED.

Figure 6:
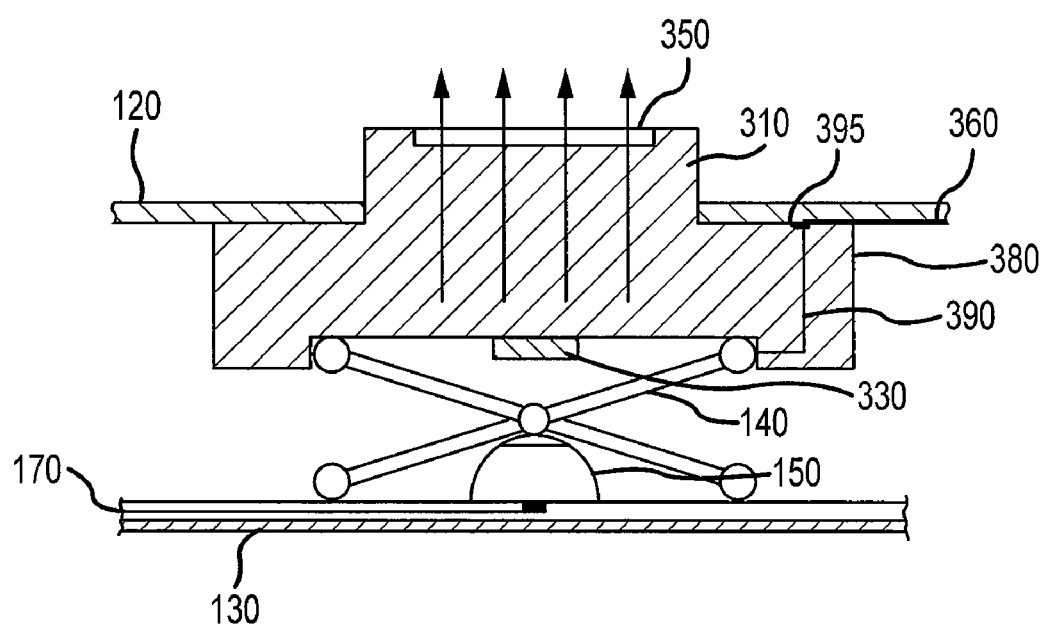
FIG. 6 is a cross-sectional view similar to that of FIG. 5, showing an alternative embodiment of a keycap with individual backlighting.
Figure 7:
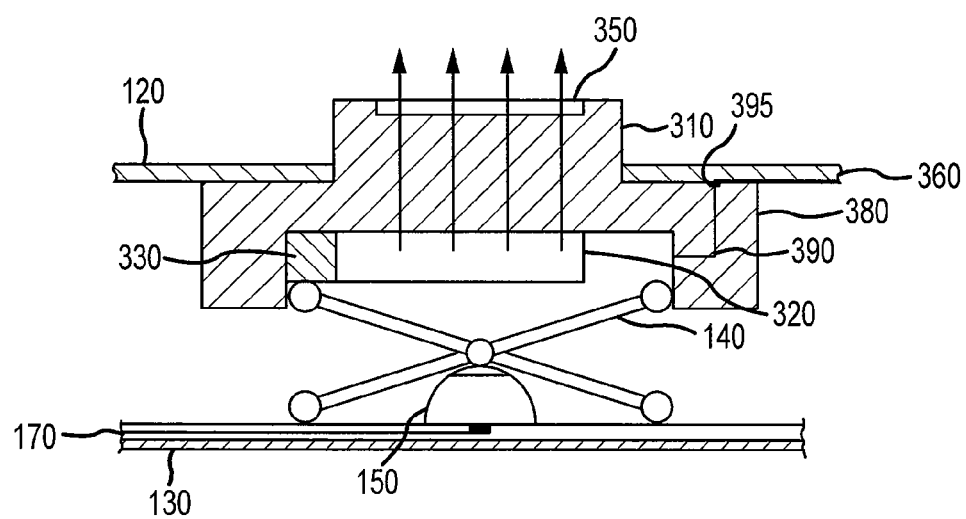
FIG. 7 is a cross-sectional view similar to that of FIG. 5, showing a third embodiment of a keycap with individual backlighting.

It should be appreciated that the light guide 320 located beneath the keycap may have microlenses formed thereon to direct light from the LED to the etched portion of the keycap, as shown by the arrows in FIGS. 5-7. In this manner, the light guide 320 may concentrate light emitted by the LED 330 in an area where it is more likely to be seen (e.g., through the etched portion 350 of the keycap 310). By guiding the light in this manner, the light guide also may reduce the amount of light that shines from beneath a key and out the sides of the keycap stack. Thus, the light guide may not only concentrate the light in a desired area but may also reduce light scattering or the "glowing" effect caused around keys by errant light.

In alternative embodiments, the keycap 310 itself may be made of a light guide material. Such a keycap may nonetheless have microlenses formed to direct light from the LED 330 to the etched surface. In embodiments where the keycap is made from a light guide material, the LED may be bottom-firing and located beneath the keycap. The top-firing LED may be held in place through the scissor mechanism or a mechanical support.

Yet another embodiment may have a keycap 310 made fully or partially from a light guide material and may use a side-firing LED 330. In this embodiment, a portion of the keycap light guide may extend downwardly and abut or be near the LED. The light from the LED 330 may enter the downwardly-extending portion of the keycap 310 and be redirected upward, as discussed above.

It should be appreciated that the light guide 320 need not run along the entirety of the base of the keycap 310, as shown in FIG. 7. Rather, the light guide may run along a portion of the keycap base and extend only as far as the edge of the legend 350 or other etching furthest from the LED. Since light need not be directed anywhere except beneath the etching 350 by the light guide 320, it is generally not necessary to extend the light guide past the etching edge.

It will be appreciated that power is typically externally supplied to the LED 330 in order for the LED to operate in the manner described herein. Since the LED 330 and light guide 320 are not located beneath the scissor 140, dome switch layer 150 and associated wiring 170, the power wiring for the LEDs may be different from that of conventionally backlit keyboards such as the one shown in FIG. 2. In certain embodiments, traces or wiring may extend vertically from the wiring layer 170 (or other wiring providing power) to the LED 330. Such embodiments may use flex cable to connect the wiring layer and LEDs. The flex cable may bend as the keycap moves downward, thus maintaining the electrical connection between wiring layer and LED.

Figure 8:
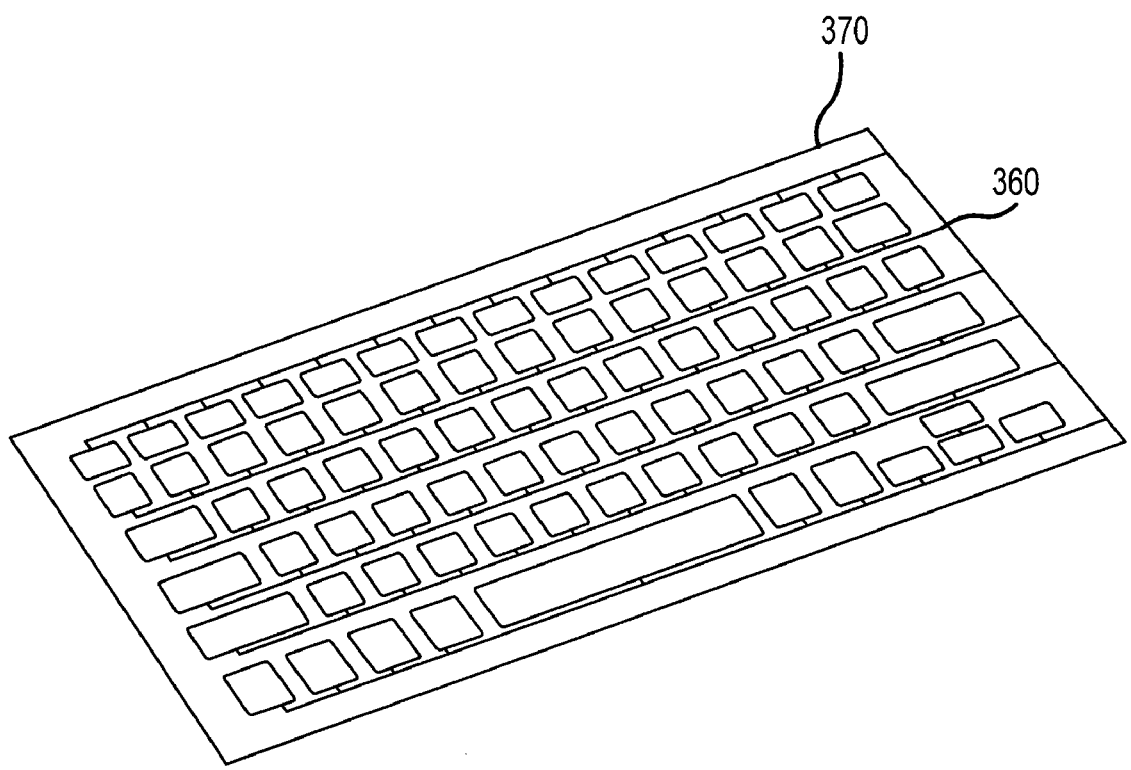
FIG. 8 is a sample wiring pattern for use with the keyboards of FIGS. 3 and 4.

Other embodiments may use a different wiring configuration, one example of which is shown in FIG. 5 and in better view in FIG. 8. An electrical wiring pattern 360 may be formed on a substrate 370 which is located directly beneath the top 120 of the keyboard 300. The electrical wiring 360 may provide power to each LED 330 in a keycap stack. As shown in cross-section in FIG. 5, the keycap 310 may include a ridge or flange 380 that extends outwardly and under a faceplate 120 of the keyboard. That is, the top of the keycap protrudes upward through an aperture in the housing while the flange extends under the faceplate. An electrical contact 390 may run from the LED 330, through the keycap 310 (or along a surface of the keycap) and terminate in a contact point 395 on the flange. The wiring 360 may run beneath the faceplate 120 and touch the contact point 395 when the key is not depressed. Thus, when the key is in a resting position (e.g., is not being pressed by a user), power may be provided to the LED through the wiring pattern, contact point and electrical contact.

When the user presses down on the key in this embodiment, the electrical connection between the wiring pattern 360 and electrical contact 390 is broken as the key 310 moves away from the keyboard faceplate 120. Thus, when the key is pressed, the LED 330 will turn off and the key will not be illuminated. Presumably, the key is being pressed by a user's finger located atop the etched surface that transmits light. Thus, although the LED is inactive, the user's finger, stylus or the like may cover the etched surface of the keycap and thus prevent the user from noticing that the key is no longer illuminated. When the key returns to its rest position, the electrical contact 390 and wiring pattern 360 again touch and the LED 330 may again be illuminated.

In another embodiment, the flange 380 may be omitted or greatly reduced in size. The electrical contact 390 extending from the LED 330 may terminate at a side of the keycap 310 which abuts a portion of the wiring pattern 360. Thus, when the key is at rest, the electrical contact and wiring pattern are in contact and the LED may illuminate. As with the prior embodiment, pressing down on the key moves the electrical contact 390 away from the wiring pattern 360 and breaks the flow of current to the LED 330. Further, if the side of the keycap 310 abuts the faceplate 120, they may impact one another as the keyboard moves. This abrasive action may remove dirt and other debris that might otherwise become stuck to either the keycap or faceplate and disrupt the electrical connection between the wiring pattern and LED.

In the foregoing embodiments, the wiring pattern 360 may be formed directly on the back side of the keyboard faceplate 120 or may be a separate layer adjacent the back side of the faceplate. If the wiring pattern is formed as a separate layer, it may be attached to the faceplate in certain embodiments.

In another embodiment, a portion of the top of each dome 150 in the dome switch layer 160 may be made of metal. Essentially a trace may be run along a side of the dome and may connect to the LED's electrical contact 390 (which would thus extend downward to the dome). By running the trace along the dome and insulating it from the metal portion of the dome, power may be provided to the LED as long as the trace touches the LED's electrical contact. Since the dome 150 collapses as the key is pressed and springs back as the key is released, this embodiment may provide power to the LED 330 during a key press. The dome, in such embodiments, may have a metal trace covered by an elastomer used to form the rest of the dome.

In yet another embodiment, the scissors mechanism 140 or a portion thereof may be made from metal and serve to connect a power source to the LED 330. For example, a leg of each scissor structure may be electrically conductive and connected to a wiring pattern 360 beneath (or above) the scissor. The scissor leg may likewise contact the LED's electrical contact 390, thus acting to provide power from the wiring pattern to the LED. Insofar as the scissor moves with the keycap and thus the LED, the scissor may provide power to the LED regardless of the physical motion or state of the keycap.

It should be noted that some embodiments may not employ a scissor mechanism 140 or other support for the keycap 310 at all. Instead, each keycap 310 may be suspended in an elastic material, such as rubber, silicon and the like. The keycaps may thus be pressed but are biased upward when not under pressure by the elastic material. In these embodiments, power may be provided to the LEDs 330 through electrical traces formed on or adjacent the bottom side of the suspended keycaps and running to a power source.

In embodiments providing an electrical connection between a wiring pattern 360 formed or adjacent a keyboard faceplate 120 and a LED 330 beneath the keycap, as described above, the dome switch 150 may be omitted. Instead, when the circuit formed by the wiring pattern 360 and the electrical contact 390 breaks, a microprocessor operationally connected to the wiring pattern may detect this break and register it as a key press. Thus, the wiring pattern may be used not only to selectively power the LED and backlight or otherwise illuminate the key, but also to provide input detection and functionality to the keys. In some embodiments, the breaking of this electrical circuit may function as an input only it if occurs for a sufficient length of time, such as the time typically necessary to fully depress a key while typing and have the key spring back to a rest state. This may aid in determining the difference between a deliberate keystroke and an accidental key impact.

Figure 9:
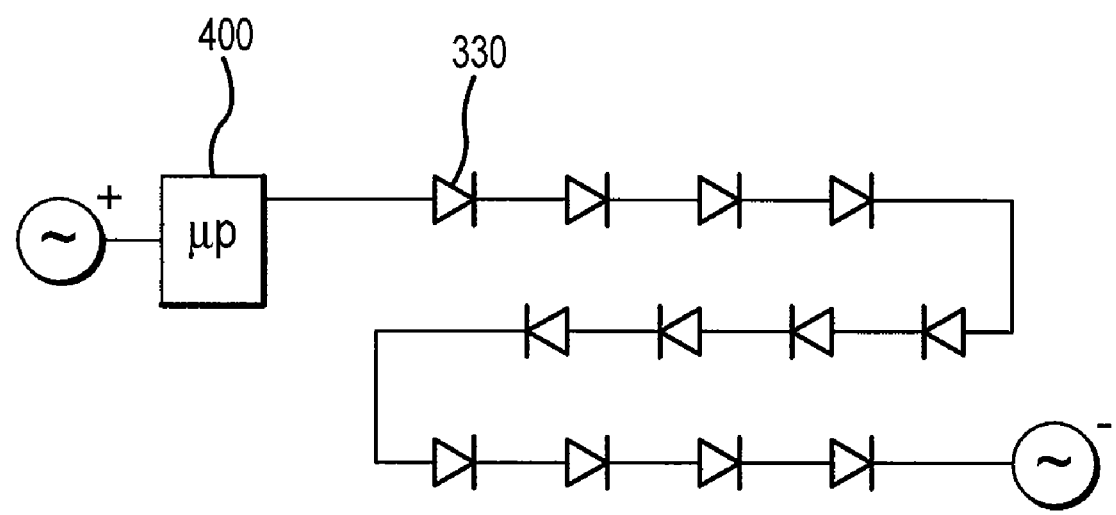
FIG. 9 is a first wiring diagram for use with individually-illuminated keycaps.
Figure 10:
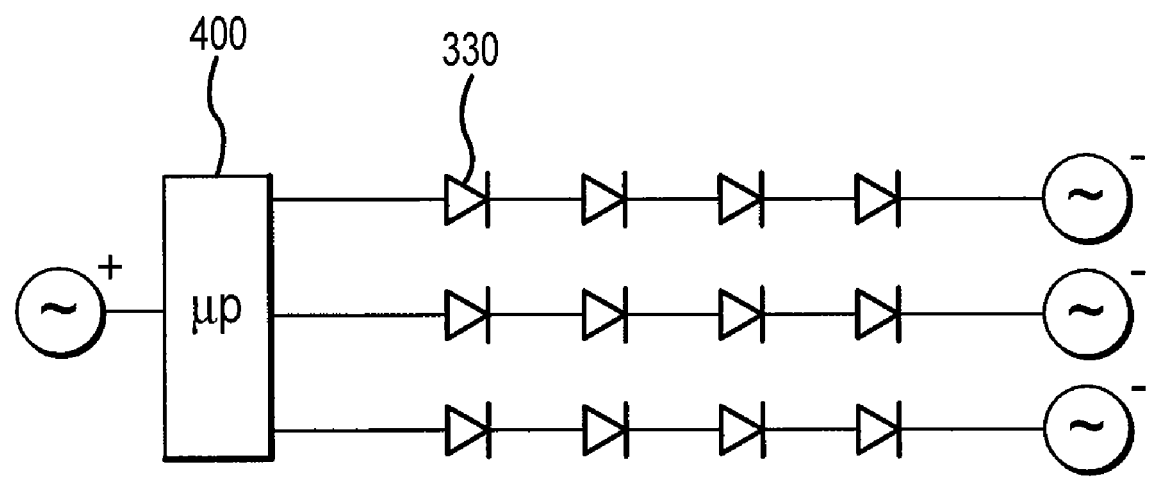
FIG. 10 is a second wiring diagram for use with individually-illuminated keycaps.

It should be appreciated that each key may have an individual LED 330 and light guide 320 associated therewith. Accordingly, a keyboard 300 implementing certain embodiments discussed herein may need to provide power to multiple LEDs. LEDs may be wired in series, as shown in FIG. 9, or sets of LEDs may be wired in parallel as per FIG. 10. Further, a microcontroller 400 may be electrically connected to the LEDs in order to control current flow to the LEDs. Thus, the microcontroller may control the on/off state of the LEDs, the brightness of the LEDs and so forth. Whether or not individual LEDs may be controlled separate from one another depends on the wiring arrangement.

In some embodiments, an organic light-emitting diode (OLED) may be used in place of the LED 330. Further, since OLEDs are relatively small and thin, the OLED may be deposited directly on a surface of the light guide, such as the guide's bottommost surface or side surface.

Typically, although not necessarily, each key of a keyboard 300 (or each button on a mouse, trackpad and the like) has a single LED 330 and light guide 320 located beneath it. In alternative embodiments, certain keys may have multiple light guides and/or LEDs associated therewith. For example, a single light guide may be placed beneath a space bar but have two LEDs in communication with the light guide. One LED may be at each end of the space bar, to continue the example.

Although embodiments have been described herein with respect to keys on a keyboard, it should be appreciated that this document's teachings may be applied to other devices and/or mechanisms, such as buttons on a mouse or trackball, a track pad and the like. Further, variants and alternative embodiments will be apparent to those of ordinary skill in the art upon reading this disclosure. Accordingly, the proper scope of protection is defined by the appended claims.

I claim:

1. An input device, comprising:
   an input mechanism operative to move along an axis, the input mechanism having a front face and a back face;
   a housing mechanically connected to the input mechanism;
   a light source located beneath the input mechanism;
   a light guide optically coupled to the light source and the input mechanism and entirely located beneath the input mechanism; wherein
   the light guide redirects at least some light emitted from the light source through the back face of the input mechanism and through the front face of the input mechanism; and
   wherein the light guide concentrates the redirected light on a portion of the input mechanism.

2. The input device of claim 1, wherein the input mechanism is a key of a keyboard.

3. The input device of claim 1, wherein the light source is chosen from the group comprising a light-emitting diode and an organic light-emitting diode.

4. The input device of claim 2, further comprising:
   a second input mechanism operative to move along an axis, the input mechanism having a front face and a back face;
   a second light source located beneath the input mechanism;
   a second light guide optically coupled to the second light source and the second input mechanism and entirely located beneath the second input mechanism; wherein
   the housing is mechanically connected to the second input mechanism;
   the second light guide redirects at least some light emitted from the second light source through the back face of the second input mechanism and through the front face of the second input mechanism; and
   the first and second light guides are physically separated.

5. The input device of claim 1, wherein:
   the front face of the input mechanism is etched with a legend; and
   the light guide directs light through the legend.

6. The input device of claim 5, wherein:
   the light guide abuts the back face of the input mechanism; and
   the light guide extends in a direction along less than an entirety of the back face of the input mechanism, but at least along an entirety of the back face corresponding to the legend etched on the front face.

7. The input device of claim 1, further comprising:
   a wiring pattern at least partially disposed between the housing and the input mechanism.

8. The input device of claim 7, wherein:
   the housing comprises a faceplate through which a portion of the input mechanism projects;
   the input mechanism comprises:
      a flange extending under the faceplate; and
      an electrical contact coupled to the light source and terminating at the flange; wherein
   the wiring pattern contacts the electrical contact when the input mechanism is in a first state, thereby providing power to the light source.

9. The input device of claim 7, wherein the wiring pattern does not contact the electrical contact when the input mechanism is in a second state, thereby shutting off power to the light source.

10. The input device of claim 7, wherein:
    the housing comprises a faceplate through which a portion of the input mechanism projects;
    the input mechanism comprises an electrical contact coupled to the light source and terminating at a sidewall of the input mechanism; wherein
    the wiring pattern contacts the electrical contact when the input mechanism is in a first state, thereby providing power to the light source.

11. A method for illuminating an input mechanism, comprising:
    providing power to a light source located beneath the input mechanism through an electrical connection between a portion of the input mechanism and a housing for the input mechanism;
    directing light emitted from the light source by changing a direction of travel of the light, such that the light passes through the input mechanism;
    concentrating the directed light on a portion of the input mechanism; and
    in response to a disruption in the electrical connection, the disruption caused by a motion of the input mechanism, ceasing to provide power to the light source.

12. The method of claim 11, further comprising:
    reestablishing the electrical connection; and
    in response to reestablishing the electrical connection, providing power to the light source.

13. The method of claim 12, further comprising:
    in response to the disruption in the electrical connection, registering an input from the input mechanism; and
    in response to reestablishing the electrical connection, ceasing to register an input from the input mechanism.

14. The method of claim 11, wherein the input mechanism is a key of a keyboard.

15. The method of claim 14, wherein the operation of directing light emitted from the light source by changing a direction of travel of the light, such that the light passes through the input mechanism comprises:

receiving light in a light guide located entirely beneath the input mechanism; and passing the light through a microlens formed in the light guide; wherein the light exiting the microlens illuminates an etching of the surface of the input mechanism.

16. An input device, comprising:

a plurality of input mechanisms mechanically attached to an input device housing;

a plurality of light guides, each of the plurality of light guides located beneath and adjacent to each of the plurality of input devices in a one-to-one relationship, each of the light guides not extending beyond an outer edge of the associated input mechanism;

a plurality of light sources, at least one light source of the plurality of light sources coupled to each light guide, each of the at least one light sources emitting light into the coupled light guide; and a plurality of mechanical support underlying the plurality of light guides and the plurality of input mechanisms;

wherein each of the plurality of light guides concentrate light emitted by a respective one of the plurality of light sources onto a portion of the respective associated input mechanism.

17. The input device of claim 16, wherein the plurality of mechanical supports hold the plurality of light guides against the plurality of input mechanisms.

18. The input device of claim 17, further comprising:

a wiring pattern located beneath a portion of the input device housing but above the mechanical support, and electrically connected to each of the plurality of light sources; wherein the wiring pattern is electrically connected to the plurality of light sources by a plurality of electrical contacts.

19. The input device of claim 18 further comprising a microprocessor operationally connected to the wiring pattern and operative to generate an input signal in response to detecting an electrical break between the wiring pattern and one of the plurality of electrical contacts.

20. The input device of claim 16, wherein the plurality of light sources are organic light-emitting diodes.

* * * * *